(12) United States Patent
Dehlwes

(10) Patent No.: US 9,428,023 B2
(45) Date of Patent: Aug. 30, 2016

(54) PNEUMATIC SPRING

(71) Applicant: VIBRACOUSTIC CV AIR SPRINGS GMBH, Hamburg (DE)

(72) Inventor: Stephan Dehlwes, Norderstedt (DE)

(73) Assignee: VIBRACOUSTIC CV AIR SPRINGS GMBH, Hamburg (DE)

( * ) Notice: Subject to any disclaimer, the term of this patent is extended or adjusted under 35 U.S.C. 154(b) by 0 days.

(21) Appl. No.: 14/417,194

(22) PCT Filed: Jun. 13, 2013

(86) PCT No.: PCT/EP2013/062224
§ 371 (c)(1),
(2) Date: Jan. 26, 2015

(87) PCT Pub. No.: WO2014/016046
PCT Pub. Date: Jan. 30, 2014

(65) Prior Publication Data
US 2015/0210134 A1    Jul. 30, 2015

(30) Foreign Application Priority Data
Jul. 25, 2012    (EP) .................................... 12005420

(51) Int. Cl.
F16F 9/04 (2006.01)
B60G 11/27 (2006.01)
F16F 9/05 (2006.01)

(52) U.S. Cl.
CPC ............. B60G 11/27 (2013.01); F16F 9/0454 (2013.01); F16F 9/05 (2013.01); F16F 9/057 (2013.01); *B60G 2202/152* (2013.01); *B60G 2206/424* (2013.01); *B60G 2206/71* (2013.01); *B60G 2206/82* (2013.01); *B60G 2206/91* (2013.01)

(58) Field of Classification Search
CPC ............ B60G 11/27; B60G 2202/152; B60G 2206/71; B60G 2206/82; B60G 2206/424; F16F 9/042; F16F 9/0454; F16F 9/0463; F16F 9/05; F16F 9/057
See application file for complete search history.

(56) References Cited

U.S. PATENT DOCUMENTS

| | | | | |
|---|---|---|---|---|
| 2,933,308 A | * | 4/1960 | McGavern, Jr. | ........ B60G 11/27 267/256 |
| 3,078,086 A | | 2/1963 | Bank | |
| 3,897,941 A | * | 8/1975 | Hirtreiter | .............. F16F 9/0409 267/64.24 |
| 4,378,935 A | * | 4/1983 | Brown | .................. F16F 9/0454 267/64.27 |
| 4,899,995 A | * | 2/1990 | Hoffman | ............... F16F 9/0463 267/64.24 |
| 5,566,929 A | * | 10/1996 | Thurow | .................... F16J 3/041 267/64.24 |
| 5,580,033 A | * | 12/1996 | Burkley | ................ F16F 9/0409 264/258 |
| 5,934,652 A | * | 8/1999 | Hofacre | ................... B60G 7/04 267/64.23 |
| 6,168,143 B1 | | 1/2001 | Lambrecht et al. | |
| 6,371,457 B1 | * | 4/2002 | Berg | ..................... F16F 9/0463 267/122 |

(Continued)

FOREIGN PATENT DOCUMENTS

| | | |
|---|---|---|
| CN | 1218547 A | 6/1999 |
| CN | 101103211 A | 1/2008 |

(Continued)

*Primary Examiner* — Christopher Schwartz
(74) *Attorney, Agent, or Firm* — Leydig, Voit & Mayer, Ltd.

(57) ABSTRACT

A pneumatic spring for utility vehicles comprising a rolling bellows and a rolling piston. The rolling bellows has at least one bead-like plug-on edge. The rolling piston is of unipartite form and includes an interior space constantly exchanging air with an air chamber enclosed by the rolling bellows. At the plug-on edge, the rolling bellows has a sealing bead with an inelastic bead core for connection to the rolling piston. The fastening of the plug-on edge to the rolling piston, with position securing action and sealing action, is disposed on an inner side of a rolling piston edge.

19 Claims, 7 Drawing Sheets

(56) References Cited

U.S. PATENT DOCUMENTS

| | | |
|---|---|---|
| 6,386,524 B1 | 5/2002 | Levy et al. |
| 2002/0153646 A1* | 10/2002 | Weitzenhof ............ F16J 3/042 267/64.27 |
| 2008/0197547 A1 | 8/2008 | Hock |
| 2010/0127438 A1 | 5/2010 | Eise et al. |
| 2011/0266728 A1 | 11/2011 | Bank |

FOREIGN PATENT DOCUMENTS

| | | |
|---|---|---|
| CN | 102245926 A | 11/2011 |
| DE | 946950 C | 8/1956 |
| DE | 1285792 B | 12/1968 |
| DE | 4118577 A1 | 12/1992 |
| DE | 19642683 A1 | 4/1998 |
| DE | 102006038807 A1 | 2/2008 |
| DE | 102006040546 B4 | 9/2010 |
| EP | 0859165 A1 | 8/1998 |
| EP | 1862335 B1 | 12/2007 |
| GB | 935831 A | 9/1963 |
| WO | 0161207 A1 | 8/2001 |
| WO | WO 0235112 A2 | 5/2002 |
| WO | WO 2007142153 A1 | 12/2007 |
| WO | WO 2009015821 A1 | 2/2009 |
| WO | 2012054524 A1 | 4/2012 |

* cited by examiner

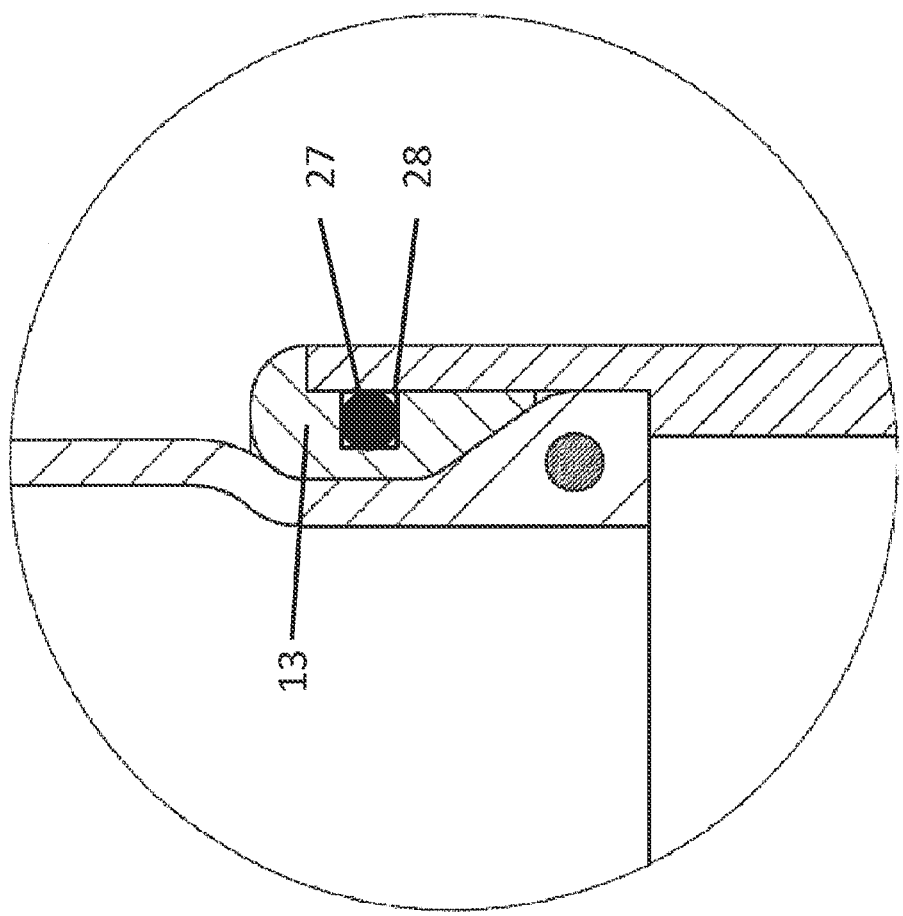

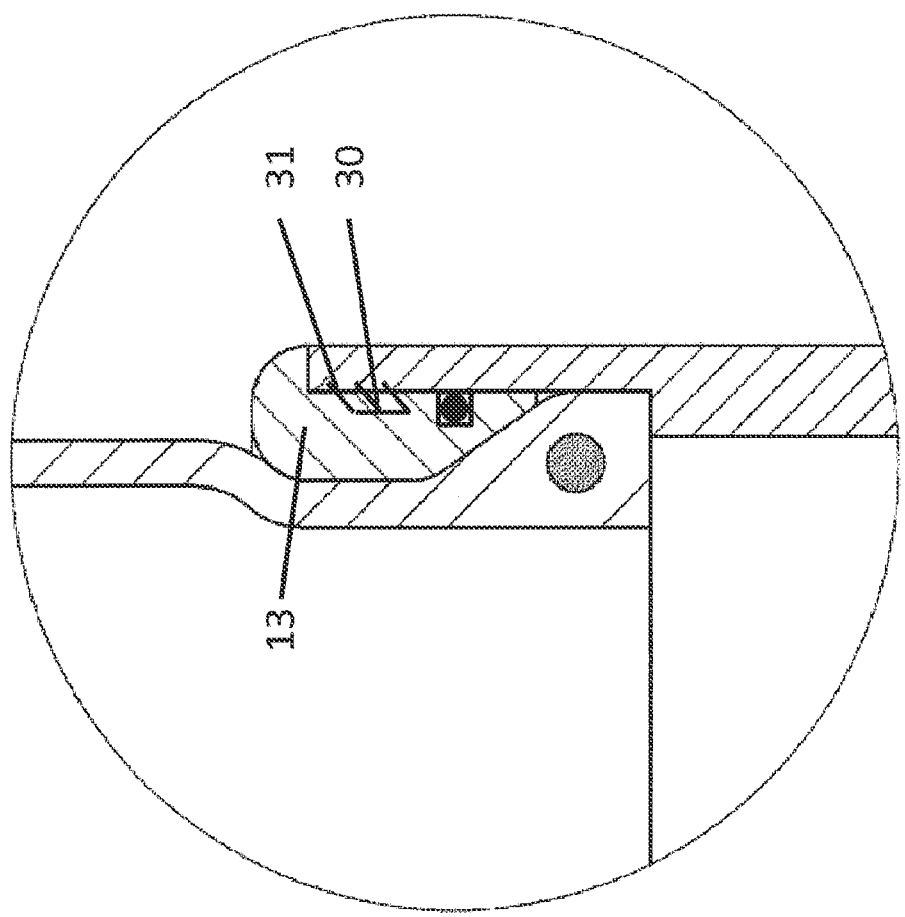

PNEUMATIC SPRING

CROSS-REFERENCE TO RELATED APPLICATIONS

This application is a U.S. National Phase application under 35 U.S.C. §371 of International Application No. PCT/EP2013/062224, filed on Jun. 13, 2013, and claims benefit to European Patent Application No. EP 120 05 420, filed on Jul. 25, 2012. The International Application was published in German on Jan. 30, 2014, as WO 2014/016046 A1 under PCT Article 21 (2).

TECHNICAL FIELD

The invention relates to a pneumatic spring with rolling bellows, which rolling bellows has at least one bead-like plug-on edge, and rolling piston, in particular for utility vehicles.

BACKGROUND

Pneumatic springs which are designed as rolling bellows are, in terms of their basic construction, composed of a rolling piston to which the one end of a rolling bellows is fastened. The other end of the rolling bellows adjoins a closure cover or a second rolling piston. The rolling pistons are very differently equipped. To achieve a high level of spring comfort, it is expedient for the internal volume of the rolling piston to also be utilized for the spring action. The rolling piston is then designed as a hollow body and is generally assembled from multiple parts. Such designs are cumbersome and correspondingly expensive. Normally, the rolling pistons are assembled from two parts which are welded together. In the case of two-part steel pistons, the weld seam has approximately the same strength as the base material. It is more problematic if the rolling piston is produced from plastic. In the case of a two-part rolling piston composed of a plastic, this results in restrictions in terms of function. For strength reasons, it is normally not possible for the entire spring travel to be utilized. Rolling pistons composed of plastic for utility vehicles may duly also be produced in unipartite form, but have a small internal volume, which leads to reduced comfort of the pneumatic spring.

WO 2007/142153 A1 presents a pneumatic spring which has a two-part piston. The piston is composed of an upper part and a lower part which are welded together. On the upper part of the piston there is provided an inwardly directed shoulder onto which the bead-like plug-on edges of the rolling bellows are plugged. The other end of the rolling bellows has specially formed edges which are encompassed by a flanged edge of a cover. The interior space of the piston is permanently connected to the interior air chamber of the rolling bellows. A disadvantage of this embodiment is the two-part design of the rolling piston and the different design of the fastening ends of the rolling bellows.

A similar design to that described above emerges from the U.S. Pat. No. 6,386,524 B1. In said document there is provided a piston embodiment in which the piston is produced from plastic and has a double annular wall which is closed off by a base. Also provided in said document is a two-part design of the rolling piston and a rolling bellows which is equipped with different plug-on edges.

A further embodiment of a rolling piston composed of plastic is presented in DE 10 2006 040 546 B4. In said document, there is likewise provided a piston which has an inner and an outer chamber which communicate with one another via openings. Also, in said document, the piston is closed off by a cover, such that a two-part embodiment is provided.

Further two-part embodiments of plastics pistons emerge from WO 2009/015821 A1 and EP 1 862 335 B1.

In U.S. Pat. No. 3,078,086 an air spring with a rolling piston in a unipartite form is disclosed, at which inner side a bead of a rolling bellows is fastened by a cup.

WO 02/035112 A1 shows an air spring, which air spring bellows is fastened at the inner side of a rolling piston by means of a fastening ring. The inner side of the rolling piston and the fastening ring thereby form corresponding conical surfaces.

Further EP 0859 165 A1 discloses an air spring with a hose rolling bellows, providing a sealing bead with a metallic core, wherein the sealing bead is fastened at the outer side of a rolling piston.

SUMMARY

In an embodiment, the present invention describes a pneumatic spring for utility vehicles comprising a rolling bellows and a rolling piston. The rolling bellows has at least one bead-like plug-on edge. The rolling piston is of unipartite form and includes an interior space constantly exchanging air with an air chamber enclosed by the rolling bellows. At the plug-on edge, the rolling bellows has a sealing bead with an inelastic bead core for connection to the rolling piston. The fastening of the plug-on edge to the rolling piston, with position securing action and sealing action, is disposed on an inner side of a rolling piston edge.

BRIEF DESCRIPTION OF THE DRAWINGS

The present invention will be described in even greater detail below based on the exemplary figures. The invention is not limited to the exemplary embodiments. All features described and/or illustrated herein can be used alone or combined in different combinations in embodiments of the invention. The features and advantages of various embodiments of the present invention will become apparent by reading the following detailed description with reference to the attached drawings which illustrate the following:

FIG. 7 shows a fastening ring with an annular groove for receiving a sealing ring, and FIG. 8 shows a fastening ring with lug-like detent hooks which engage into corresponding detent grooves on the receptacle.

DETAILED DESCRIPTION

Figure 1:
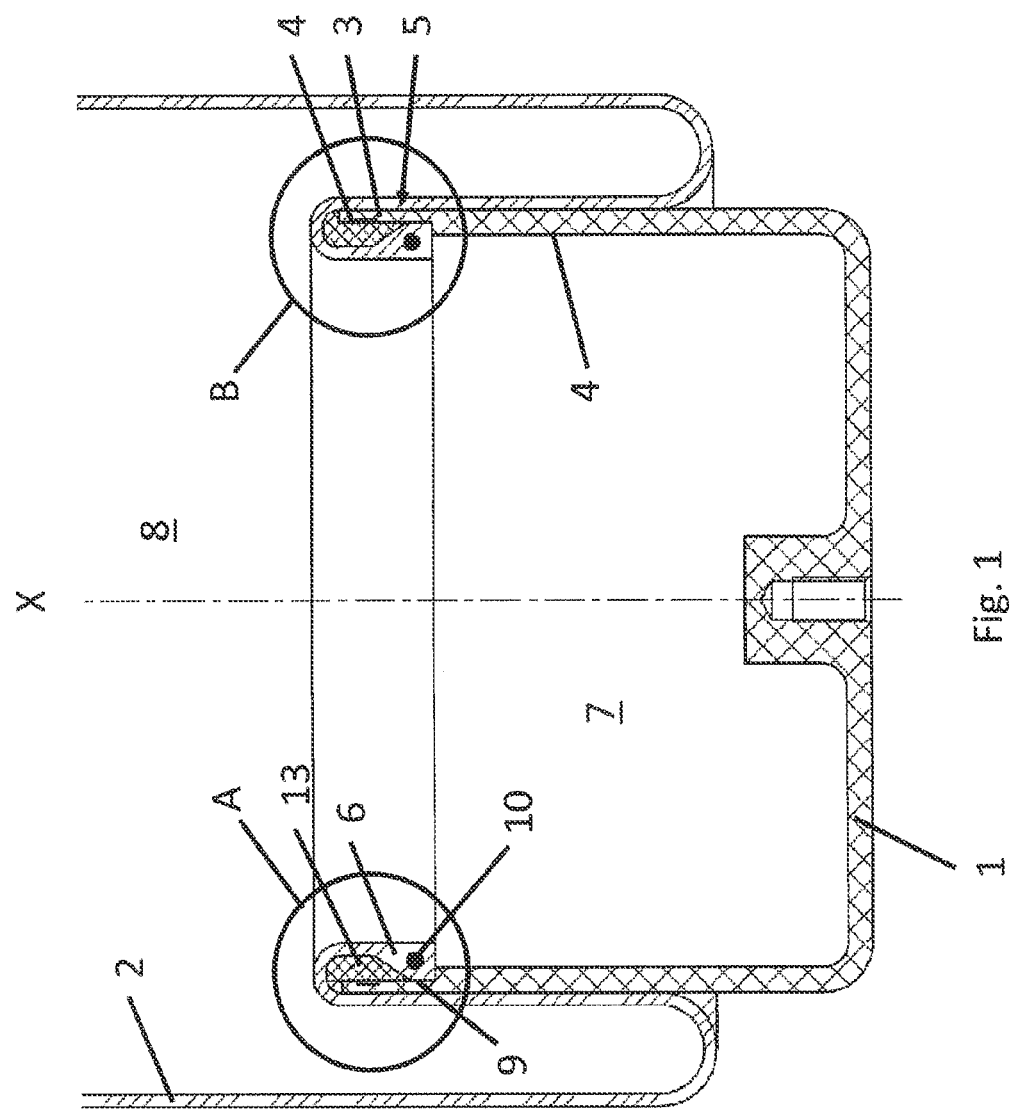
FIG. 1 shows, in section and in a schematic illustration, a unipartite rolling piston produced from plastic, onto the edge of which the plug-on edge of the rolling bellows has been attached by means of a fastening ring.

An aspect of the invention is producing an improved pneumatic spring which is of simple construction, permits inexpensive manufacture, permits easy assembly and yields a high level of spring comfort.

In the present invention, a unipartite rolling piston is used, the interior space of which constantly exchanges air with the air chamber enclosed by the rolling bellows. Furthermore, a rolling bellows is used which has, at least at its plug-on edge for connection to the rolling piston, a sealing bead with an inelastic bead core. The fastening of the plug-on edge to the rolling piston, with position securing action and sealing action, is realized on the inner side of the rolling piston edge.

The unipartite form of the rolling piston is made possible by the fastening of the plug-on edge on the inner side of the rolling piston. The bead of the plug-on edge is designed correspondingly for this purpose.

The rolling piston edge has, on its inner side, a receptacle for the plug-on edge of the rolling bellows. Said receptacle is formed from an annular surface running parallel to the central axis of the rolling piston, which annular surface may also be equipped with an undercut, and from a radially projecting axial abutment for the sealing bead of the plug-on edge. The plug-on edge is held in its position on the rolling piston ring by means of a fastening ring. Said fastening ring is of wedge-shaped form at least in sections as viewed in cross section. In the operating state, the fastening ring is held by the rolling bellows by virtue of the rolling bellows engaging in looped fashion around the fastening ring. A fastening ring is preferably used which has a wedge-shaped surface only on one side. Said wedge-shaped surface points toward the base of the rolling piston. The fastening ring furthermore has a planar surface which bears against the undercut. Said planar surface of the fastening ring ends at the upper edge of the undercut. It is also expedient if the wedge surface is adjoined by a support surface running parallel to the axis. This form of the fastening ring corresponds to the end of the rolling bellows and to the plug-on edge provided thereon. Here, it must be stated, that the bead of the inserted plug-on ring is directed radially outward. This means that the bead of the rolling bellows is oriented oppositely than is the case in the hitherto known common plug-on connections of rolling bellows. During the assembly process, the plug-on edge is pushed into the receptacle of the piston. At the same time, or subsequently, the fastening ring is pushed into the receptacle between undercut and rolling bellows. When the air pressure in the pneumatic spring rises, the roll loop of the rolling bellows forms, such that the rolling bellows comes to bear against the rolling wall of the piston and, in the process, loops around the fastening ring.

The preferred embodiment of the fastening ring provides that the latter is equipped with a projection which bears against the axial outer side of the rolling piston edge. In this way, the fastening ring is fixed in its position on the receptacle. To secure its position in the receptacle, the fastening ring may be adhesively bonded to the inner side of the receptacle on the rolling piston edge. Other solutions are also possible here; for example, the fastening ring may be equipped, on its radial outer side, with an annular groove for receiving a seal ring. It is also possible for the fastening ring to be equipped with a positioning bore or holding bore which serves for receiving a positioning or holding pin which is screwed into the wall of the receptacle. Also possible is an embodiment in which encircling lug-like detent hooks are provided in the inner side of the receptacle, which detent hooks engage into corresponding encircling detent grooves on the inserted fastening ring. Finally, a solution is also conceivable in which the fastening ring has detent hooks which, when the fastening ring is inserted into the receptacle, engage into a corresponding detent groove of the receptacle wall.

The present invention is suitable in particular for rolling pistons which are composed of a plastic. In this case, it is also expedient for the rolling bellows to be a cross-ply rolling bellows which functions without lateral support walls.

Owing to the plug-on seat being relocated to the inner edge of the rolling piston, it is possible for the rolling piston to be of unipartite form, for example in the manner of a pot, and for the maximum internal volume of the rolling piston to be utilized for the spring action. By means of the fastening ring, the plug-on seat is held in a predefined position, and the pneumatic spring bellows is secured in gas-tight and secured fashion to the rolling piston. The assembly process is straightforward, and special auxiliary means for the insertion of the plug-on frame and of the fastening ring are not required.

The invention will be explained in more detail below on the basis of the exemplary embodiments illustrated in the drawing.

FIG. 1 schematically shows, in section, a piston 1 composed of plastic and with a rolling bellows 2 connected thereto. The rolling piston 1 is, on its inner side 4 at its upper edge 3, equipped with a receptacle 5 for the plug-on edge 6 of the rolling bellows 2. The interior space 7 of the rolling piston 1 constantly exchanges air with the air chamber 8 enclosed by the rolling bellows 2. The plug-on edge 6 has the sealing bead 9 with the inelastic bead core 10.

Figure 2:
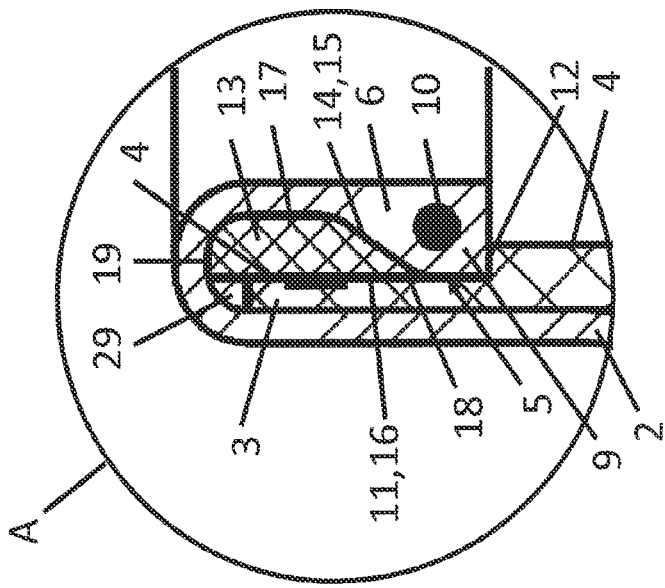
FIG. 2 shows the left-hand side of the rolling piston edge on an enlarged scale, with a fastening ring, the upper edge of which terminates with the upper edge of the rolling piston.

FIG. 2 shows, on an enlarged scale, the detail A of the left-hand side of FIG. 1. The receptacle 5 on the inner side 4 of the rolling piston edge 3 is formed by an undercut, which is composed of an annular surface 11 running parallel to the central axis of the rolling piston 1 and of the radially projecting axial abutment 12 for the sealing bead 9. The plug-on edge 6 of the rolling bellows 2 is held in its position on the rolling piston edge 3 by the fastening ring 13. The fastening ring 13 has a section 14 of wedge-like form. Said section 14 corresponds with the surface 15, which runs parallel, on the plug-on edge 6 or the sealing bead 9. The fastening ring 13 is held in its position by the rolling bellows 2 by virtue of the rolling bellows 2 engaging in looped fashion around the fastening ring 13. The fastening ring 13 has a planar surface 16 which bears against the annular surface 11, and furthermore has a support surface 17 which runs parallel to said surface and by which said fastening ring bears against the rolling bellows 2. The tip 18 of the fastening ring 13 points toward the base of the rolling piston 1. The bead 9 of the plug-on edge 6 is, in the installed state, directed radially outward. In this case, said bead is in contact, by way of the region covered by the bead core 10, with the inner surface 4 of the rolling piston wall 3. The upper edge 19 of the fastening ring 13 terminates with the upper edge 29 of the undercut of the receptacle 5. Both the fastening ring 13 and the upper edge of the rolling piston edge 3 are slightly rounded in order to avoid sharp corner edges.

Figure 3:
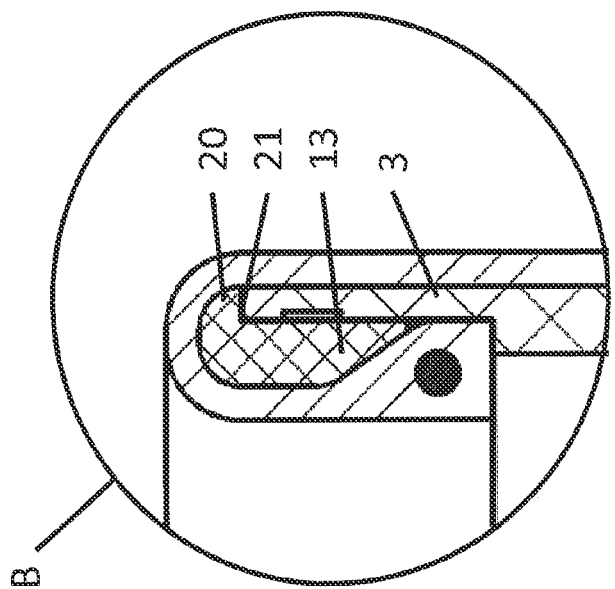
FIG. 3 shows the fastening shown on the right-hand side of FIG. 1, with a fastening ring which has a projection bearing against the rolling piston edge.

FIG. 3 shows the detail B from FIG. 1 on an enlarged scale. The design on the right-hand side of FIG. 1 is similar to that of FIG. 2, with the difference that the fastening ring 13 has the projection 20 by which it lies on the top side 21 of the rolling piston edge 3. This is the preferred embodiment of the fastening ring 13.

Figure 4:
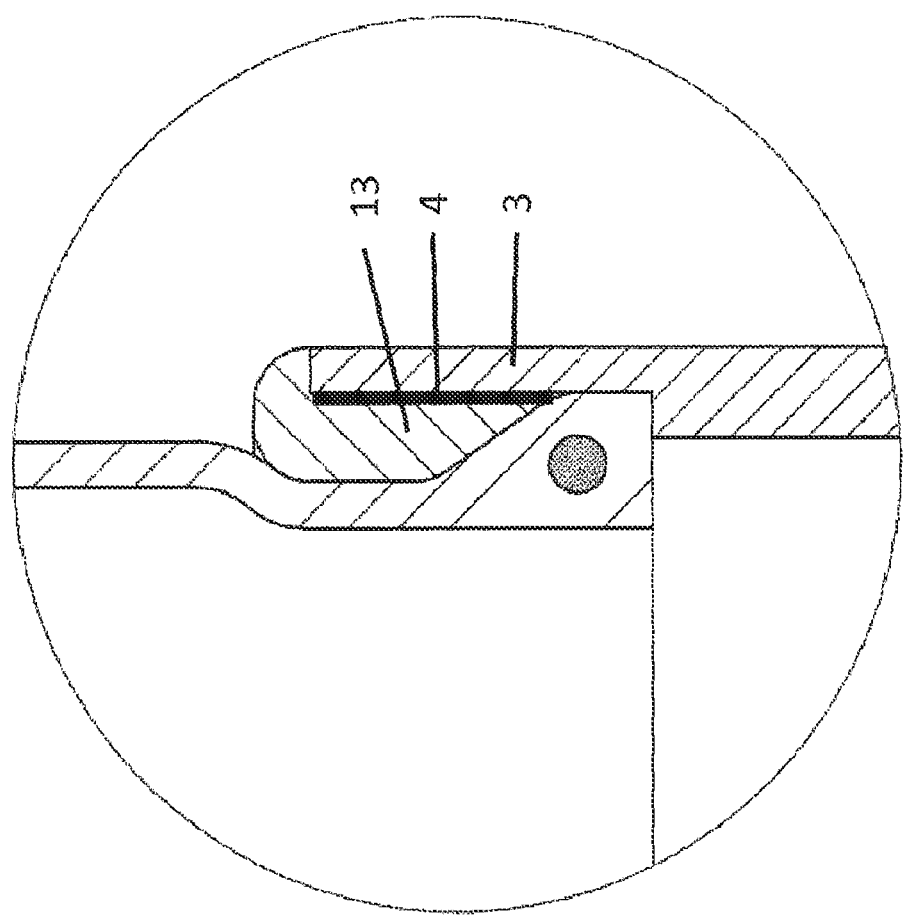
FIG. 4 shows an embodiment as per FIG. 3, in which the fastening ring is adhesively bonded to the wall of the undercut.
Figure 5:
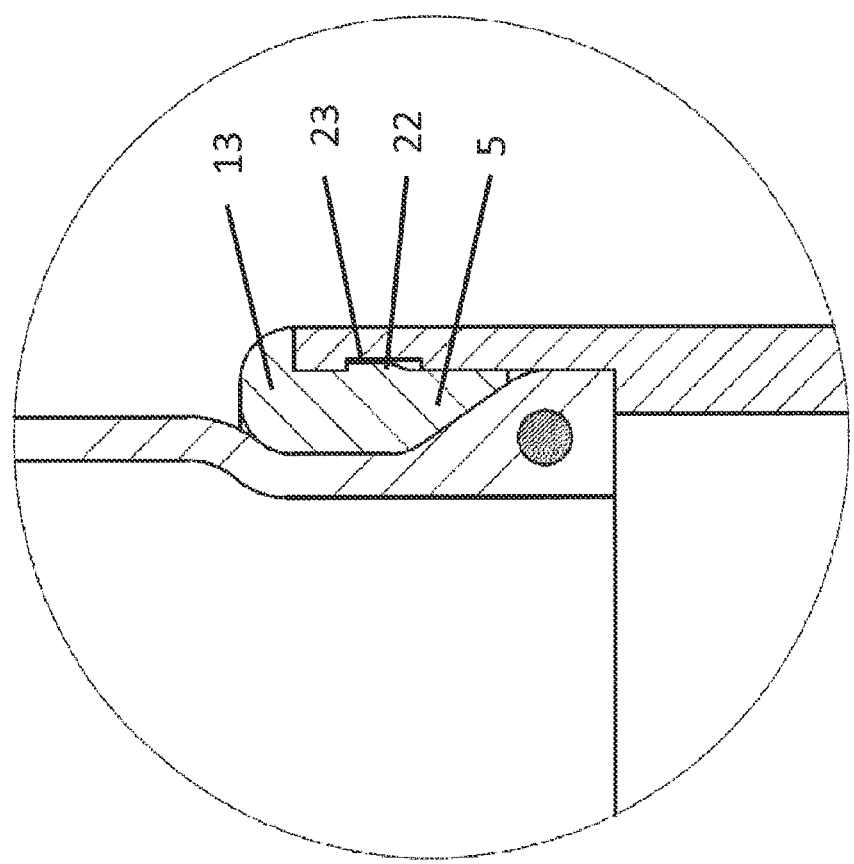
FIG. 5 shows a fastening ring with an encircling detent hook which engages into a corresponding detent groove in the receptacle wall.
Figure 6:
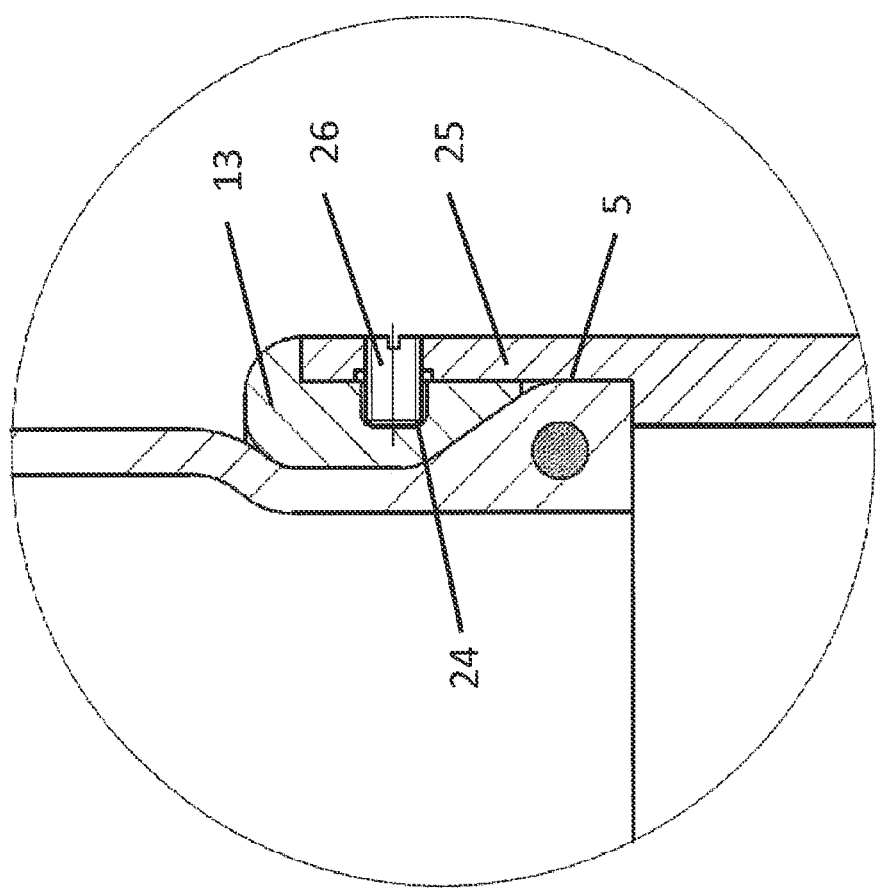
FIG. 6 shows a fastening ring with a positioning bore and with a positioning pin screwed into the receptacle wall.

FIGS. 4 to 8 show possible developments, illustrating additional possibilities for the holding of the fastening ring 13 and for the sealing action. Accordingly, FIG. 4 shows a fastening ring 13 which is adhesively bonded to the inner side 4 of the rolling piston edge 3. FIG. 5 shows a fastening ring 13 with a detent hook 22 which engages into a corresponding detent groove 23 of the receptacle 5. FIG. 6 shows the fastening ring 13 with a positioning bore 24 which is engaged into by a positioning pin that is screwed into the wall of the receptacle 5. FIG. 7 shows the possibility of accommodating an additional sealing ring 27 in the annular groove 28 in the fastening ring 13. Finally, it is possible for the fastening ring 13 to be equipped with detent hooks 30 which, when the fastening ring is inserted into the receptacle 5, engage into corresponding detent grooves 31 in the receptacle wall. In FIGS. 4 to 8, the rolling bellows 2 is shown in the unpressurized and still unrolled state.

While the invention has been illustrated and described in detail in the drawings and foregoing description, such illustration and description are to be considered illustrative or exemplary and not restrictive. It will be understood that changes and modifications may be made by those of ordinary skill within the scope of the following claims. In particular, the present invention covers further embodiments with any combination of features from different embodiments described above and below.

The terms used in the claims should be construed to have the broadest reasonable interpretation consistent with the foregoing description. For example, the use of the article "a" or "the" in introducing an element should not be interpreted as being exclusive of a plurality of elements. Likewise, the recitation of "or" should be interpreted as being inclusive, such that the recitation of "A or B" is not exclusive of "A and B," unless it is clear from the context or the foregoing description that only one of A and B is intended. Further, the recitation of "at least one of A, B and C" should be interpreted as one or more of a group of elements consisting of A, B and C, and should not be interpreted as requiring at least one of each of the listed elements A, B and C, regardless of whether A, B and C are related as categories or otherwise. Moreover, the recitation of "A, B and/or C" or "at least one of A, B or C" should be interpreted as including any singular entity from the listed elements, e.g., A, any subset from the listed elements, e.g., A and B, or the entire list of elements A, B and C.

The invention claimed is:

1. A pneumatic spring for utility vehicles, the pneumatic spring comprising:
   a rolling bellows having at least one bead-like plug-on edge; and
   a rolling piston that is of unipartite form and that includes an interior space constantly exchanging air with an air chamber enclosed by the rolling bellows and a rolling piston edge with an inner side including an annular surface;
   a fastening ring abutting the annular surface;
   wherein, at the plug-on edge, the rolling bellows has a sealing bead with an inelastic bead core for connection to the rolling piston; and
   wherein the fastening of the plug-on edge to the rolling piston, with position securing action and sealing action, is disposed on the inner side of the rolling piston edge, wherein the plug-on edge of the rolling bellows is held in position on the rolling piston edge via the fastening ring.

2. The pneumatic spring according to claim 1, wherein the rolling piston edge has, on the inner side, a receptacle for the plug-on edge of the rolling bellows.

3. The pneumatic spring according to claim 2, wherein the receptacle includes an undercut with the annular surface running parallel to a central axis of the rolling piston and with a radially projecting axial abutment for the sealing bead.

4. The pneumatic spring according to claim 2, wherein the fastening ring is equipped with at least one bore for receiving a pin which is screwed into a wall of the receptacle.

5. The pneumatic spring according to claim 2, wherein lug-like detent hooks are disposed on an outer side of the fastening ring, which detent hooks engage into a corresponding provided detent groove on the receptacle.

6. The pneumatic spring according to claim 2, wherein the fastening ring has detent hooks which, when the fastening ring is inserted into the receptacle, engage into a corresponding detent groove in a receptacle wall.

7. The pneumatic spring according to claim 1, wherein the fastening ring has a surface, which bears against the annular surface, and a wedge surface, which is formed at an angle with respect to the undercut.

8. The pneumatic spring according to claim 7, wherein a tip of the fastening ring points toward a base of the rolling piston.

9. The pneumatic spring according to claim 7, wherein the wedge surface is adjoined by a support surface running parallel to a piston axis.

10. The pneumatic spring according to claim 1, wherein the rolling bellows is a cross-ply rolling bellows.

11. The pneumatic spring according to claim 1, wherein the fastening ring is of wedge-shaped form at least in sections as viewed in cross section.

12. The pneumatic spring according to claim 1, wherein the fastening ring is held by the rolling bellows by virtue of the rolling bellows engaging in looped fashion around the fastening ring.

13. The pneumatic spring according to claim 1, wherein the bead of the plug-on edge is configured to the form of the fastening ring.

14. The pneumatic spring according to claim 1, wherein the bead is directed radially outward.

15. The pneumatic spring according to claim 1, wherein the fastening ring has a projection which bears against an axial outer side of the rolling piston edge.

16. The pneumatic spring according to claim 1, wherein the fastening ring is adhesively bonded to the inner side of the rolling piston edge.

17. The pneumatic spring according to claim 1, wherein the fastening ring has, on a radial outer side, an annular groove for receiving a seal ring.

18. The pneumatic spring according to claim 1, wherein the rolling piston is composed of a plastic.

19. The pneumatic spring according to claim 1, wherein the fastening ring is of multi-part form.

* * * * *